US012736095B1

(12) United States Patent
Powell et al.

(10) Patent No.: US 12,736,095 B1
(45) Date of Patent: Sep. 15, 2026

(54) TRANSMISSION ASSEMBLIES WITH OVERRUNNING CLUTCH AND ASSOCIATED SYSTEMS AND METHODS

(71) Applicant: The Boeing Company, Arlington, VA (US)

(72) Inventors: Charles B. Powell, Mesa, AZ (US); Maura C. Wear, Mesa, AZ (US); Caleb R. Shill, Mesa, AZ (US); Hon-Wai W. Chun, Phoenix, AZ (US); Gary A. Craig, Mesa, AZ (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 19/079,826

(22) Filed: Mar. 14, 2025

(51) Int. Cl.

| | |
|---|---|
| ***F16D 41/00*** | (2006.01) |
| ***F16D 3/18*** | (2006.01) |
| ***F16D 3/84*** | (2006.01) |
| ***F16D 41/07*** | (2006.01) |
| ***F16H 1/12*** | (2006.01) |

(52) U.S. Cl.
CPC ............ *F16D 41/07* (2013.01); *F16D 3/185* (2013.01); *F16D 3/843* (2013.01); *F16H 1/12* (2013.01)

(58) Field of Classification Search
CPC .......... F16H 1/12; F16H 57/021; F16D 3/185; F16D 3/843; F16D 41/07; F16D 41/064
See application file for complete search history.

(56) References Cited

U.S. PATENT DOCUMENTS

| | | | | |
|---|---|---|---|---|
| 3,918,830 | A * | 11/1975 | Schneider | F16D 47/02 376/281 |
| 4,398,432 | A | 8/1983 | Quick | |
| 5,511,642 | A | 4/1996 | Klotz et al. | |
| 5,802,918 | A | 9/1998 | Chen et al. | |
| 6,443,035 | B1 | 9/2002 | Scardullo | |
| 11,187,283 | B2 | 11/2021 | Beigang et al. | |
| 2018/0163795 | A1 * | 6/2018 | Olson | F16H 57/0025 |
| 2020/0277998 | A1 | 9/2020 | Beigang et al. | |

FOREIGN PATENT DOCUMENTS

| | | | |
|---|---|---|---|
| EP | 1295788 | B1 | 12/2008 |

* cited by examiner

*Primary Examiner* — William C Joyce

(74) *Attorney, Agent, or Firm* — Walters & Wasylyna LLC

(57) ABSTRACT

A transmission assembly includes a first shaft, a second shaft, and an overrunning clutch coupled between the first shaft and the second shaft. The second shaft includes a clutch section and an engagement section. The clutch section is coupled to the overrunning clutch. The engagement section is coupled to the clutch section by a crowned spline coupling. The crowned spline coupling isolates displacement of the engagement section relative to the clutch section.

20 Claims, 10 Drawing Sheets

118
110
172
170
174
120
150
100
128

118
110
176
172
140
130
176
160
164
170
174
162
120
150
100
128

100
118
112
110
172
130
140
170
176
160
102
174
120
150
122
128

100
118
112
110
172
130
140
176
170
160
102
174
120
150
122
128

212
202
200
114
210
172
100
170
174
220
222
124
204

TRANSMISSION ASSEMBLIES WITH OVERRUNNING CLUTCH AND ASSOCIATED SYSTEMS AND METHODS

FIELD

The present disclosure relates generally to transmissions and, more particularly, to transmission assemblies having overrunning clutches and systems and methods utilizing such transmission assemblies.

BACKGROUND

In transmission design, a clutch component is used to engage and disengage an input and an output component. In certain designs, components are allocated on a common shaft and primarily supported by a shared bearing set, and any movement, loading, and/or vibration generated by or through any one individual component impacts all other components on the common shaft. One problem with this arrangement is that adverse mechanical movement and vibration at the input and/or output connections can cause the clutch to slip, leading to transient loss of load followed by abrupt re-coupling that can damage the power train. Another problem with this arrangement is that misalignment between input and output connections can generate bending moments and vibratory loading at an associated connection interface, leading to misalignment and undesirable movement at the opposing connection interface.

Accordingly, those skilled in the art continue with research and development efforts in the field of transmission systems.

SUMMARY

Disclosed are examples of a transmission assembly, a transmission system, and a transmission method. The following is a non-exhaustive list of examples, which may or may not be claimed, of the subject matter according to the present disclosure.

In an example, the disclosed assembly includes a first shaft, a second shaft, and an overrunning clutch coupled between the first shaft and the second shaft. The second shaft includes a clutch section and an engagement section. The clutch section is coupled to the overrunning clutch. The engagement section is coupled to the clutch section by a crowned spline coupling. The crowned spline coupling isolates displacement of the engagement section relative to the clutch section.

In an example, the disclosed system includes a power output, an input shaft, an output shaft, an overrunning clutch, and a main transmission. The input shaft is coupled to the power output. The overrunning clutch is coupled between the input shaft and the output shaft. The main transmission is coupled to the output shaft. The output shaft includes a clutch section and an engagement section. The clutch section is coupled to the overrunning clutch. The engagement section is coupled to the clutch section by a flexible coupling, such as a crowned spline coupling. The flexible coupling isolates displacement of the engagement section relative to the clutch section.

In an example, the disclosed method includes steps of: (1) transmitting torque between a first shaft and a second shaft through an overrunning clutch coupled between the first shaft and the second shaft; and (2) isolating a displacement of an engagement section of the second shaft relative to a clutch section of the second shaft by a crowned spline coupling between the engagement section and the clutch section.

Other examples of the assembly, the system, and the method will become apparent from the following detailed description, the accompanying drawings, and the appended claims.

DETAILED DESCRIPTION

Figure 1:
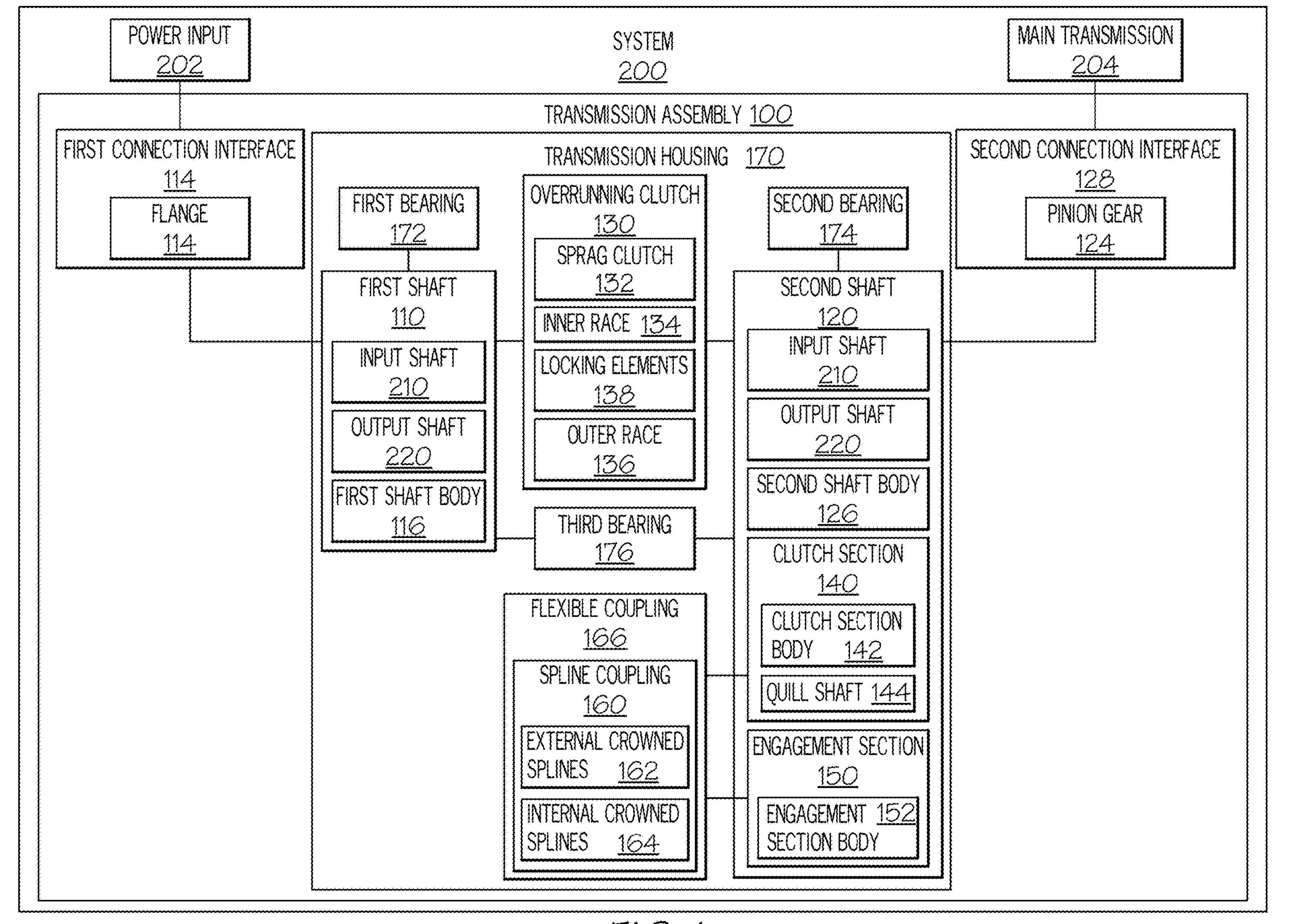
FIG. 1 is a block diagram of an example of a transmission assembly and a system utilizing the transmission assembly.

Generally, the following detailed description describes a transmission that provides an enhances reliability of an overrunning clutch in compact torque-transfer systems by minimizing vibration, motion, and loading from interfacing components. In various examples, these benefits are achieved by improving isolation from displacement and/or motion between the interfacing components and the clutch (e.g., gears and/or driveshafts). Additionally, in various examples, these benefits are achieved by improving isolation of reaction loading between input and output interfaces. In various examples, such isolation is improved by means of an intermediate shaft with a compliant (e.g., profiled) interface between input and output load paths and independent bearing supports for such load paths. Such features decouple the torque-transfer components and the clutch while allowing torque transmission. Additionally, dedicated bearing sets for the interfaces of torque-transfer components react any external loading directly into the transmission housing. By contrast, certain transmission systems have the clutch and the input/output on a single, common shaft, such that displacement, motion, and loading of clutch components (e.g., gears and/or shafts) are transferred into the clutch.

Examples of the disclosed transmission assembly, system, and method enable mechanical isolation of an overrunning clutch on an input or output of a transmission arrangement, which represents an improvement over current transmission design. Examples of the transmission assembly, disclosed herein, reduce motion, vibration, and/or loading from the input and output into the associated overrunning clutch, thereby improving the reliability and performance of the clutch. Additionally, motion, vibration, and/or loading that is transmitted into the interfacing input/output are not carried into the input/output components, thereby improving the qualities of a gear mesh interface and contact pattern with an output gear. As such, examples of the transmission assembly, disclosed herein, help to solve the problem of cross-component mechanical movement, loading, and vibration, which can affect the performance and/or capability of overrunning clutches and transmission gear meshes.

Referring now to FIGS. 1 and 3-14 by way of examples, the present disclosure is directed to transmission assembly 100 for transmitting torque between functional components of a mechanical system. The following are examples of transmission assembly 100, according to the present disclosure. Examples of transmission assembly 100 include a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

FIG. 1 depicts one or more examples of transmission assembly 100. As will be described in more detail herein, examples of the transmission assembly 100 divide a common torque-transmission shaft into independent sections, thereby separating the input component and the output component from each other and from the clutch component by means of an intermediate, interface shaft arrangement within approximately the same physical volume as existing transmission solutions. The intermediate, interface shaft utilizes a compliant, profiled interface (e.g., crowned spline interface) between sections of the torque-transmission shaft, which allows transfer of torque while accommodating angular misalignment, thereby limiting the impact of cross-component motion, vibration, and loading. In these examples, separating the sections of the torque-transmission shaft allows each section to be supported on independent bearing sets. An additional bearing set is used for interface with the transmission housing to react loading.

As illustrated in FIGS. 1 and 3-9, in one or more examples, transmission assembly 100 includes first shaft 110, second shaft 120, and overrunning clutch 130. Overrunning clutch 130 is coupled between first shaft 110 and second shaft 120. Second shaft 120 includes clutch section 140 and engagement section 150. Clutch section 140 is coupled to overrunning clutch 130. Engagement section 150 is coupled to clutch section 140 by flexible coupling 166. Flexible coupling 160 isolates displacement of engagement section 150 relative to the clutch section 140.

As illustrated in FIGS. 1 and 4-8, in one or more examples, flexible coupling 166 includes or takes the form of crowned spline coupling 160. In these examples, engagement section 150 is coupled to clutch section 140 by crowned spline coupling 160. Crowned spline coupling 160 isolates displacement of engagement section 150 relative to the clutch section 140.

In various examples of transmission assembly 100, flexible coupling 166 forms or otherwise serves as the joint between engagement section 150 and clutch section 140 of second shaft 120 that provides a compliant joining interface between engagement section 150 and clutch section 140. In other examples, flexible coupling 166 includes or takes the form of an elastomeric coupling or other type of mechanical coupling that enables or allows some degree of relative axial movement or misalignment, radial movement or misalignment, and/or angular movement or misalignment while transmitting torque through between components through flexible coupling 166.

As illustrated in FIG. 1, in one or more examples, first shaft 110 is one of input shaft 210 or output shaft 220 of system 200 (e.g., a powertrain or other transmission system. Second shaft 120 is another one of output shaft 220 or input shaft 210 of system 200. In the example illustrated in FIG. 9, first shaft 110 is input shaft 210 of system 200 and second shaft 120 is output shaft 220 of system 200. For the purpose of the present disclosure, input and output are relative terms that refer to how or where energy, motion, torque, power, or force enter a mechanical system, are transmitted through the components of the mechanical system, and leave the mechanical system.

As illustrated in FIGS. 1 and 3-8, in one or more examples, first shaft 110 includes first connection interface 118. First connection interface 118 is configured for connection of an end of first shaft 110 to an operational component of system 200. As illustrated in FIGS. 1 and 9, in one or more examples, first connection interface 118 includes or takes the form of flange 114. Flange 114 is coupled to or otherwise extends radially outward from an end of first shaft 110. As illustrated in FIG. 9, first connection interface 118 is a power input connection interface. In one or more examples, power input 202 includes or takes the form of an engine or other power system and a drive shaft. In one or more examples, first shaft 110 is coupled to power input 202 (e.g., drive shaft 212 of a power system) by flange 114 or other suitable implementation of first connection interface 118.

As illustrated in FIGS. 1 and 3-8, in one or more examples, second shaft 120 includes second connection interface 128. Second connection interface 128 is configured for connection of an end of second shaft 120 and, more particularly, an end of engagement section 150, to an operational component of system 200. As illustrated in FIGS. 1 and 9, in one or more examples, second connection interface 128 includes or takes the form of pinion gear 124. Pinion gear 124 is coupled to or otherwise extends radially outward from an end of engagement section 150. As illustrated in FIG. 9, second connection interface 128 is a power output connection interface. In one or more examples, main transmission 204 includes or takes the form of a gearbox that distributes power. In one or more examples, second shaft 120 is coupled to the at least one gear of main transmission 204 by pinion gear 124 or other suitable implementation of second connection interface 128. As illustrated in FIG. 9, in one or more examples, second shaft 120 is coupled to main transmission 204, for example, by at least one face gear 222 configured to mesh with pinion gear 124 or other suitable implementation of second connection interface 128.

Figure 6:
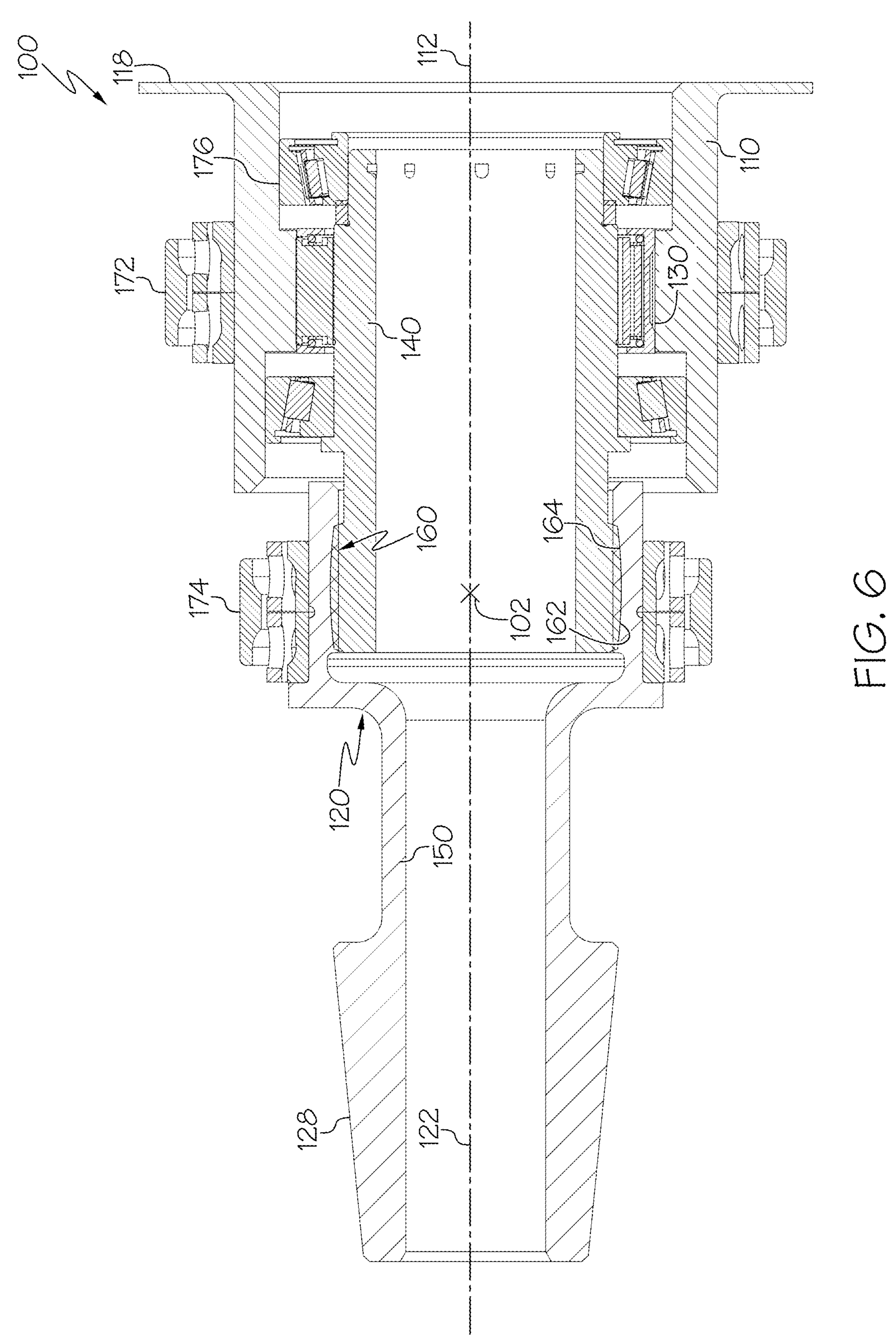
FIG. 6 is sectional, elevation view of an example of the transmission assembly shown in FIG. 5, depicted without a transmission housing.
Figure 7:
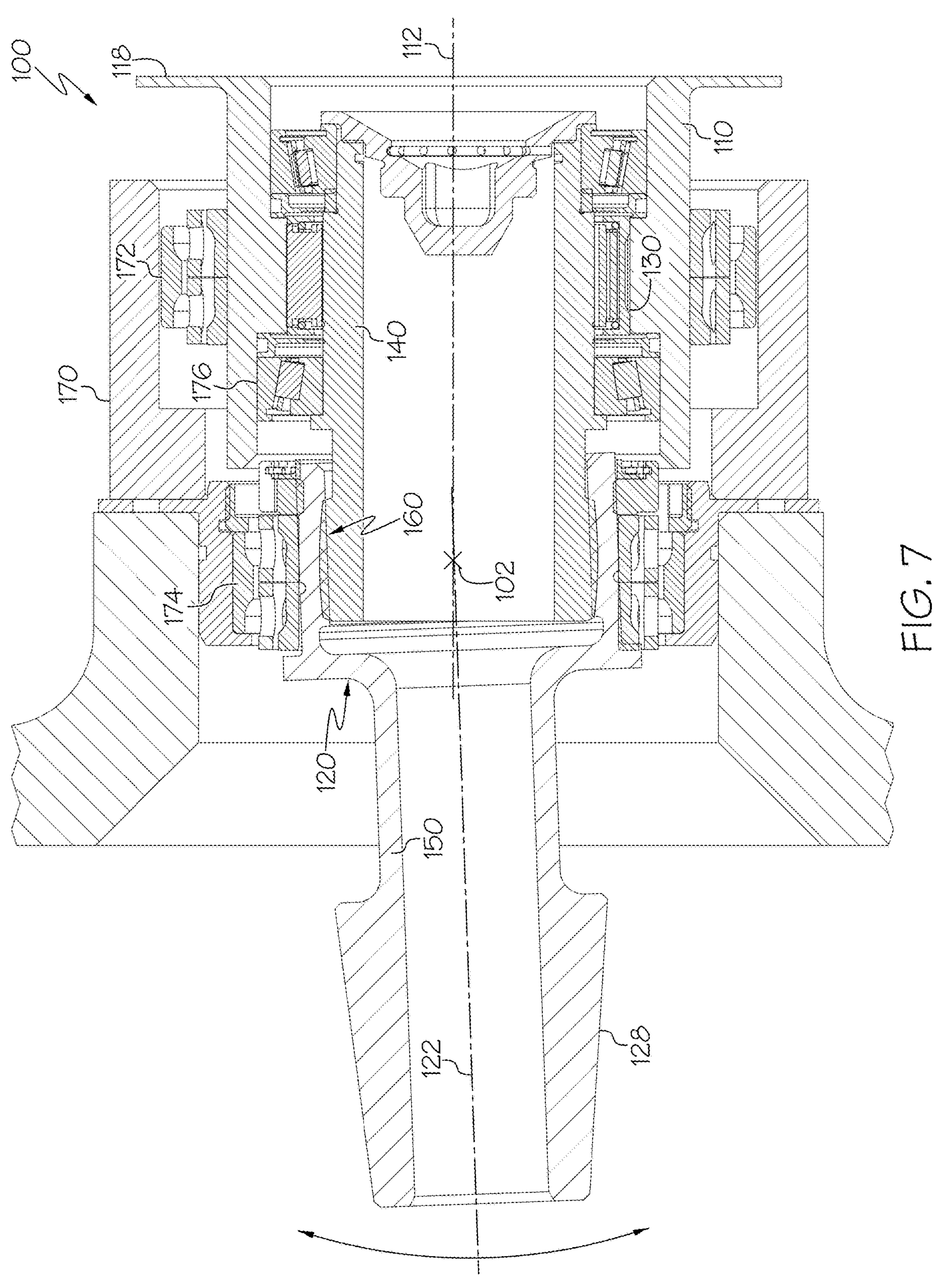
FIG. 7 is sectional, elevation view of an example of the transmission assembly, depicting shaft deflection.
Figure 8:
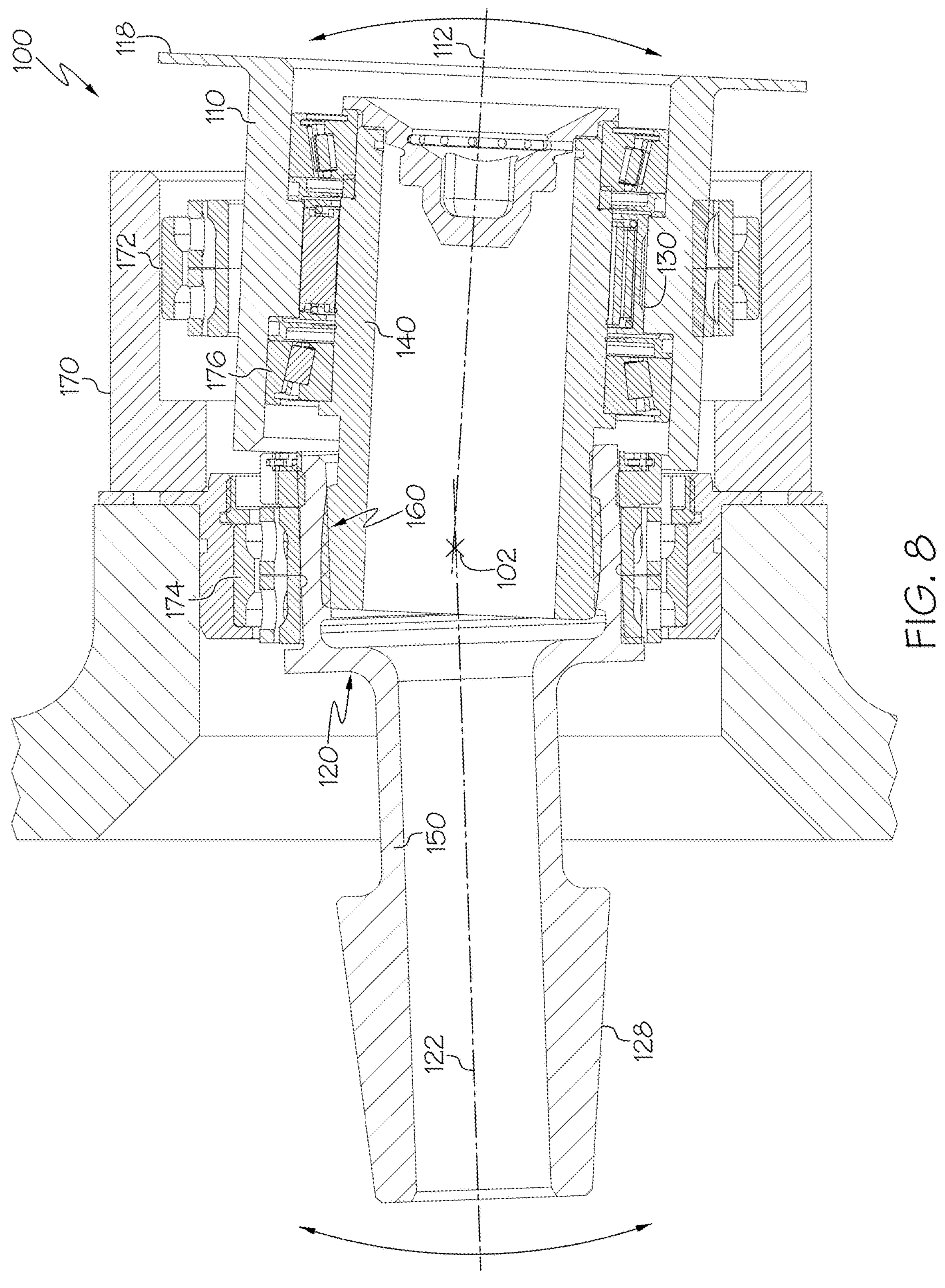
FIG. 8 is sectional, elevation view of an example of the transmission assembly, depicting shaft deflection.
Figure 9:
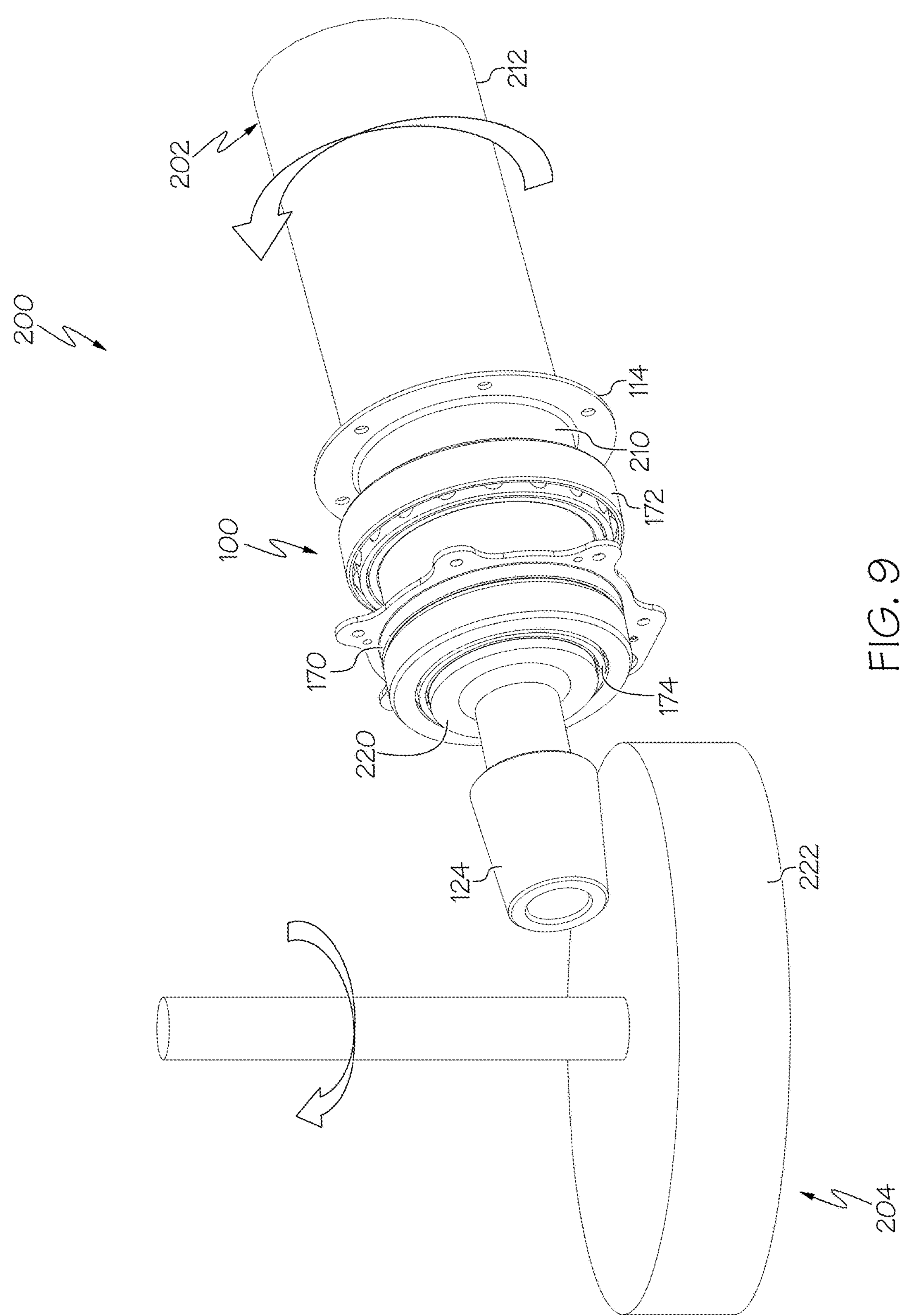
FIG. 9 is a schematic illustration of a system utilizing the transmission assembly to transmit torque.

As best illustrated in FIGS. 4-8, in one or more examples, second shaft 120 is the common shaft for torque transmission between an input and output of transmission assembly 100. Second shaft 120 is divided into two independent sections, clutch section 140 and engagement section 150. The independent sections of second shaft 120 enable separating second connection interface 128 of second shaft 120 from overrunning clutch 130 and first connection interface 118 of first shaft 110 by means of an intermediate shaft arrangement of clutch section 140 within approximately the same physical volume as existing transmissions. Spline coupling 160 enables transfer of torque while accommodating angular misalignment, as illustrated in FIGS. 7 and 8. Accommodation of angular misalignment limits the impact of cross-component motion, vibration, and loading. Separating second shaft 120 into clutch section 140 and engagement section 150 enables each section of second shaft 120 to be supported by independent bearing sets (e.g., second bearing 174 and third bearing 176). Another bearing set (e.g., first bearing 172) is used at the interface between first shaft 110 and transmission housing 170 to react loads applied to first connection interface 118.

Figure 4:
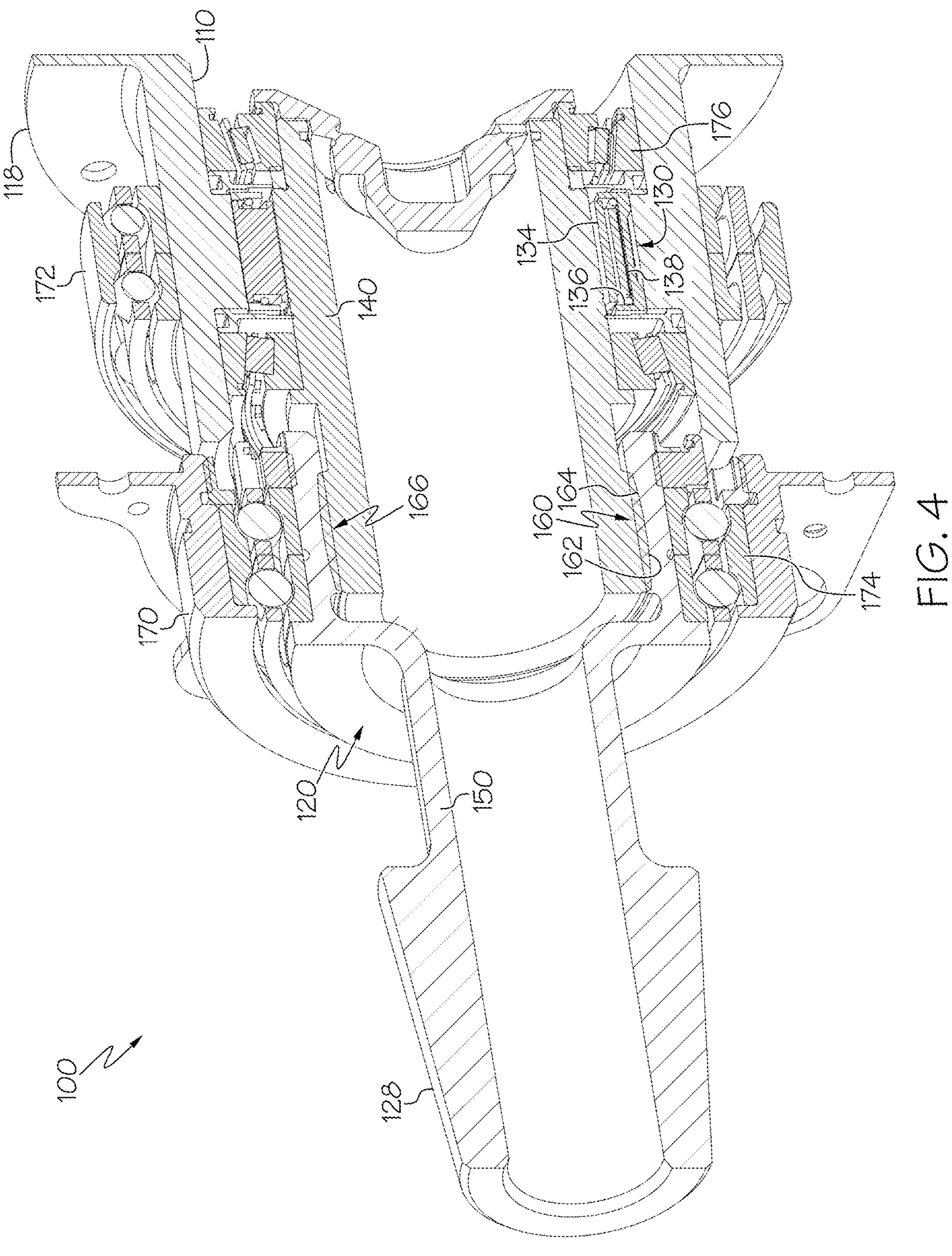
FIG. 4 is a perspective view, in section, of the example of the transmission assembly shown in FIG. 3.
Figure 5:
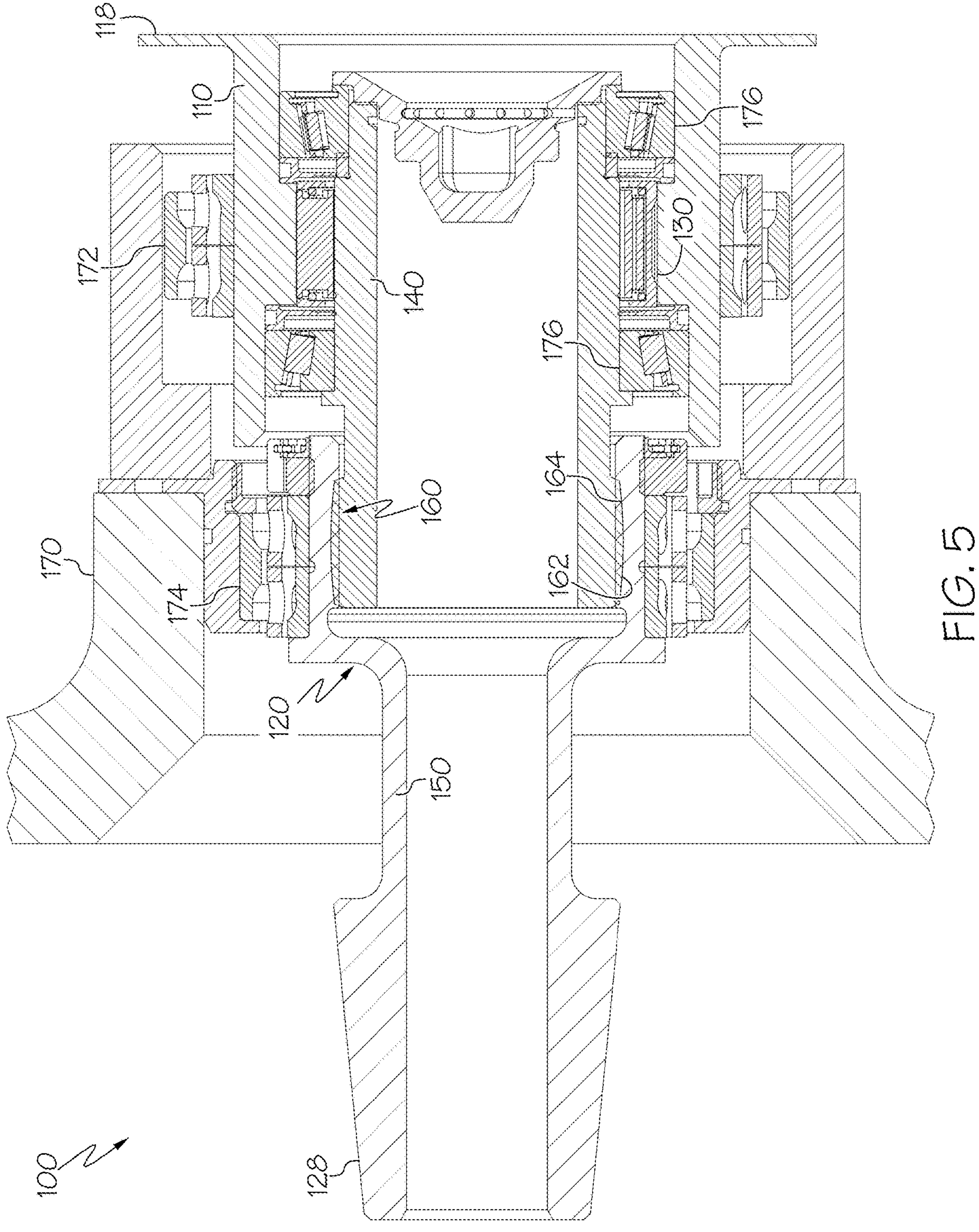
FIG. 5 is a sectional, elevation view of an example of the transmission assembly.

In one or more examples, overrunning clutch 130 includes or takes the form of any suitable one-way or freewheel clutch mechanism that allows a driven component to rotate freely in one direction while locking or engaging to transmit torque in the opposite direction. As illustrated in FIG. 4, in one or more examples, overrunning clutch 130 includes components common to such mechanical devices, including, but not limited to, inner race 134, outer race 136, and locking elements 138. In one or more examples, outer race 136 is an input race coupled to first shaft 110 (e.g., driving shaft or input source) and inner race 134 is an output race coupled to clutch section 140 (e.g., driven shaft or output). The input race rotates with the input power and the output race rotates with the input race when engaged and spins freely when disengaged from the input race. In some examples (e.g., when first shaft 110 is input shaft 210), outer race 136 rotates with first shaft 110 and serves as a torque-transmission surface. Inner race 134 rotates with the load when engaged and spins freely when disengaged. In other examples (e.g., when second shaft 120 is input shaft 210), inner race 134 rotates with second shaft 120 and serves as a torque-transmission surface. Outer race 136 rotates with the load when engaged and spins freely when disengaged. Locking elements 138 are positioned between inner race 134 and outer race 136 and enable the one-way function by engaging and disengaging inner race 134 and outer race 136. In various examples, locking elements 138 include or take the form of rollers, sprags, pawl and ratchet. In some examples, inner race 134 and/or outer race 136 include features (e.g., ramps or slots) that facilitate locking or freewheeling, depending on the type of locking elements 138. In other examples, overrunning clutch 130 can include other components such as springs, retainers, a cage framework, lubrication, or bearings. Generally, overrunning clutch 130 has two modes of operation, engaged mode (e.g., driving) and overrunning mode (e.g., freewheeling). In the engaged mode, when the race coupled to the input source rotates in the "locking" direction, locking elements 138 wedge or catch between inner race 134 and outer race 136, thereby transmitting torque from the input to the output. In the overrunning mode, when the race coupled to the output spins faster than the other race, or when the race coupled to the input source reverses, locking elements 138 disengage, thereby allowing the output race to rotate independently without resistance from the input race.

As illustrated in FIG. 1, in one or more examples, overrunning clutch 130 includes of takes the form of sprag clutch 132. In other examples, overrunning clutch 130 includes or takes the form of a roller clutch or a ratchet clutch.

FIGS. 6-8 illustrate examples of the deflection of transmission assembly 100 enabled by the independent sections of second shaft 120. FIG. 6 illustrates an example of alignment of first shaft 110 and second shaft 120 (e.g., clutch section 140 and engagement section 150) along a common axis (e.g., first shaft axis 112 and second shaft axis 122 are coincident). The example illustrated in FIG. 6 represents alignment of first connection interface 118 and second connection interface 128. FIG. 7 illustrates an example of deflection or angular displacement of engagement section 150 relative to clutch section 140, first shaft 110, and transmission housing 170. In these examples, second shaft axis 122 is angularly displaced relative to and intersects first shaft axis 112. The example illustrated in FIG. 7 represents deflection of second connection interface 128 relative to first connection interface 118. FIG. 8 illustrates an example of deflection or angular displacement of engagement section 150 relative to clutch section 140, first shaft 110, and transmission housing 170 and deflection or angular displacement of first shaft 110 and clutch section 140 relative to engagement section 150 and transmission housing 170. The example illustrated in FIG. 8 represents deflection of both second connection interface 128 and first connection interface 118.

As illustrated in FIGS. 6-8, in one or more examples, engagement section 150 is pivotable relative to clutch section 140 about pivot axis 102. As illustrated in FIGS. 7 and 8, in one or more examples, engagement section 150 of second shaft 120 is pivotable relative to first shaft 110 about pivot axis 102. Generally, pivot axis 102 is at least approximately perpendicular to second shaft axis 122 of second shaft 120 and first shaft axis 112 of first shaft 110. Upon deflection, as illustrated in FIGS. 7 and 8, pivot axis 102 is situated at the intersection of second shaft axis 122 and first shaft axis 112.

As illustrated in FIGS. 1 and 4-8, in one or more examples, first shaft 110 includes first shaft body 116. In one or more examples, first shaft body 116 is tubular and extends along first shaft axis 112. In one or more examples, first shaft body 116 is elongated. In one or more examples, first shaft body 116 includes first connection interface 118 or is otherwise configured to be operationally coupled to power input 202 or main transmission 204 by first connection interface 118.

As illustrated in FIGS. 1 and 4-8, in one or more examples, second shaft 120 includes second shaft body 126. In one or more examples, second shaft body 126 is tubular. In one or more examples, second shaft body 126 is elongated. In one or more examples, second shaft body 126 includes or is separated into clutch-section body 142 and engagement-section body 152. In one or more examples, second shaft body 126 includes second connection interface 128 or is otherwise configured to be operationally coupled to power input 202 or main transmission 204 by second connection interface 128.

As illustrated in FIGS. 1 and 4-8, in one or more examples, clutch section 140 of second shaft 120 includes clutch-section body 142. In one or more examples, clutch-section body 142 is tubular and extends along first shaft axis 112. In one or more examples, clutch-section body 142 is elongated. In one or more examples, clutch-section body 142 is flexible. In these examples, flexibility of clutch-section body 142 can enable clutch section 140 to twist or serve as a resilient member (e.g., spring) to dampen loads transmitted between first shaft 110 and engagement section 150. As illustrated in FIG. 1, in one or more examples, clutch section 140 includes or takes the form of quill shaft 144.

As illustrated in FIGS. 1 and 4-8, in one or more examples, engagement section 150 of second shaft 120 includes engagement-section body 152. In one or more examples, engagement-section body 152 is tubular and extends along second shaft axis 122. In one or more examples, engagement-section body 152 is elongated. In one or more examples, a portion (e.g., end) of engagement-section body 152 serves as a sleeve or otherwise receives a portion (e.g., end) of clutch-section body 142. Alternatively, in other examples, a portion (e.g., end) of clutch-section body 142 serves as a sleeve or otherwise receives a portion (e.g., end) of engagement-section body 152. In either case, engagement section 150 and clutch section 140 of second shaft 120 are coupled together by crowned spline coupling 160.

As illustrated in FIGS. 1 and 3-8, in one or more examples, crowned spline coupling 160 includes external crowned splines 162 and internal crowned splines 164. In one or more examples, external crowned splines 162 are formed on (e.g., project from and extend around an outer surface of) clutch section 140 of second shaft 120 and internal crowned splines 164 are formed in (e.g., depend from and extend around an inner surface of) engagement section 150. However, in other examples, this arrangement can be reversed. For example, external crowned splines 162 can be formed on (e.g., project from an inner surface of) engagement section 150 of second shaft 120 and internal crowned splines 164 are formed in (e.g., depend from an outer surface of) clutch section 140.

Generally, crowned spline coupling 160 includes or forms a crowned spline interface or crowned spline connection where teeth of the spline, either on a shaft (e.g., external spline) or in a mating shaft or hub (e.g., internal spline), are shaped with a slight convex curvature, or "crown," along their length. The curved profile of the splines enhances performance of the spline joint between clutch section 140 and engagement section 150 by improving load distribution, accommodating misalignment, and reducing stress concentrations. In these examples, external crowned splines 162 are ridges or teeth on the shaft that mesh with grooves of internal crowned splines 164 in a mating part to transmit torque. In one or more examples, the splines are machined or formed with an outward curve (e.g., convex profile) along their axial length. In one or more examples, the highest point of the crown is proximate (e.g., at or near) the center of the spline and the spline tapers toward the ends. The crowned profile allows the spline to rock or adjust slightly in situations where the axes of clutch section 140 and engagement section 150 are not coincident. This is especially useful in aircraft powertrains where thermal expansion, vibration, or flexing can misalign components.

In one or more examples, engagement section 150 of second shaft 120 is linearly fixed along second shaft axis 122 or first shaft axis 112 relative to clutch section 140 and first shaft 110. In one or more examples, clutch section 140 of second shaft 120 is linearly fixed along first shaft axis 112 relative to first shaft 110. In one or more examples, first shaft 110 is linearly fixed along first shaft axis 112. In one or more examples, first shaft 110, clutch section 140 of second shaft 120, and/or engagement section 150 of second shaft 120 are anchored or otherwise secured in relative position by transmission housing 170. Alternatively, in one or more examples, engagement section 150 of second shaft 120 is linearly movable (e.g., capable or translating in some small magnitude) along second shaft axis 122 or first shaft axis 112 relative to clutch section 140 and first shaft 110.

As illustrated in FIGS. 1, 3-5 and 7-9, in one or more examples, transmission assembly 100 includes first bearing 172. First bearing 172 is situated between and is coupled to first shaft 110 and transmission housing 170. First bearing 172 supports first shaft 110 and enables rotation of first shaft 110 relative to transmission housing 170 in response to an input source. In one or more examples, as illustrated in FIG. 8, first bearing 172 has a radial clearance sufficient for first shaft 110 to pivot relative to transmission housing 170 about pivot axis 102. Pivotal movement or radial flexibility of first shaft 110 facilities or accommodates deflection of first connection interface 118 relative to transmission housing 170.

As illustrated in FIGS. 1, 3-5 and 7-9, in one or more examples, transmission assembly 100 includes second bearing 174. Second bearing 174 is situated between and is coupled to second shaft 120 and, more particularly, engagement section 150 and transmission housing 170. Second bearing 174 supports second shaft 120 and, more particularly, engagement section 150 and enables rotation of engagement section 150 relative to transmission housing 170. In one or more examples, as illustrated in FIGS. 7 and 8, second bearing 174 has a radial clearance sufficient for engagement section 150 of second shaft 120 to pivot relative to transmission housing 170 about pivot axis 102. Pivotal movement or radial flexibility of engagement section 150 facilities or accommodates deflection of second connection interface 128 relative to transmission housing 170.

As illustrated in FIGS. 1, 3-5 and 7-9, in one or more examples, transmission assembly 100 includes third bearing 176. Third bearing 176 is situated between and is coupled to first shaft 110 and second shaft 120 and, more particularly, clutch section 140. Third bearing 176 supports clutch section 140 and enables relative rotation of clutch section 140 and first shaft 110 when overrunning clutch 130 is in overrunning mode. In one or more examples, transmission assembly 100 includes more than one third bearing 176.

Referring now to FIGS. 1 and 9, by way of examples, the present disclosure is directed to system 200 for transmitting torque using transmission assembly 100 (FIGS. 3-8), also referred to herein as transmission system or powertrain system. The following are examples of system 200, according to the present disclosure. Examples of system 200 include a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

As illustrated in FIGS. 1 and 9, in one or more examples, system 200 includes power input 202, main transmission 204, and transmission assembly 100. In these examples, transmission assembly 100 is used to transmit torque, rotation, or force from the power input 202 to the main transmission 204. System 200 (e.g., transmission assembly 100) includes input shaft 210, output shaft 220, and overrunning clutch 130. In these examples, input shaft 210 is an example of first shaft 110 and output shaft 220 is an example of second shaft 120. Input shaft 210 is coupled to the power input 202. Overrunning clutch 130 is coupled between input shaft 210 and output shaft 220. Main transmission 204 is coupled to output shaft 220. As illustrated in FIGS. 1 and 3-8, output shaft 220 includes clutch section 140 and engagement section 150. Clutch section 140 is coupled to overrunning clutch 130. Engagement section 150 is coupled to clutch section 140 by flexible coupling 166. Flexible coupling 166 isolates displacement of engagement section 150 relative to clutch section 140.

As illustrated in FIGS. 6-8, in one or more examples of system 200, engagement section 150 is pivotable relative to clutch section 140 via flexible coupling 166 about pivot axis 102.

As illustrated in FIGS. 1 and 9, in one or more examples, system 200 includes flange 114 and pinion gear 124. Flange 114 is coupled to input shaft 210. Pinion gear 124 is coupled to output shaft 220. Power input 202 is coupled to the flange 114. Main transmission 204 is coupled to the pinion gear 124.

As illustrated in FIGS. 1 and 3-8, in one or more examples of system 200, flexible coupling 166 includes or takes the form of crowned spline coupling 160. In one or more examples, crowned spline coupling 160 includes external crowned splines 162 and internal crowned splines 164. In one or more examples, external crowned splines 162 are formed on clutch section 140 and internal crowned splines 164 are formed in engagement section 150. However, in other examples, the arrangement of external crowned splines 162 and internal crowned splines 164 can be reversed.

As illustrated in FIG. 1, in one or more examples of system 200, overrunning clutch 130 includes or takes the form of sprag clutch 132. In one or more examples, clutch section 140 includes or takes the form of quill shaft 144.

As illustrated in FIGS. 1 and 3-9, in one or more examples, system 200 includes transmission housing 170, first bearing 172, and second bearing 174. First bearing 172 is coupled between input shaft 210 and transmission housing 170. Second bearing 174 is coupled between engagement section 150 of output shaft 220 and transmission housing 170. In these examples, second bearing 174 has a radial clearance sufficient for engagement section 150 of output shaft 220 to pivot relative to transmission housing 170 about pivot axis 102. As illustrated in FIGS. 1 and 3-9, in one or more examples, system 200 includes third bearing 176. third bearing 176 is coupled between clutch section 140 of output shaft 220 and input shaft 210.

Figure 2:
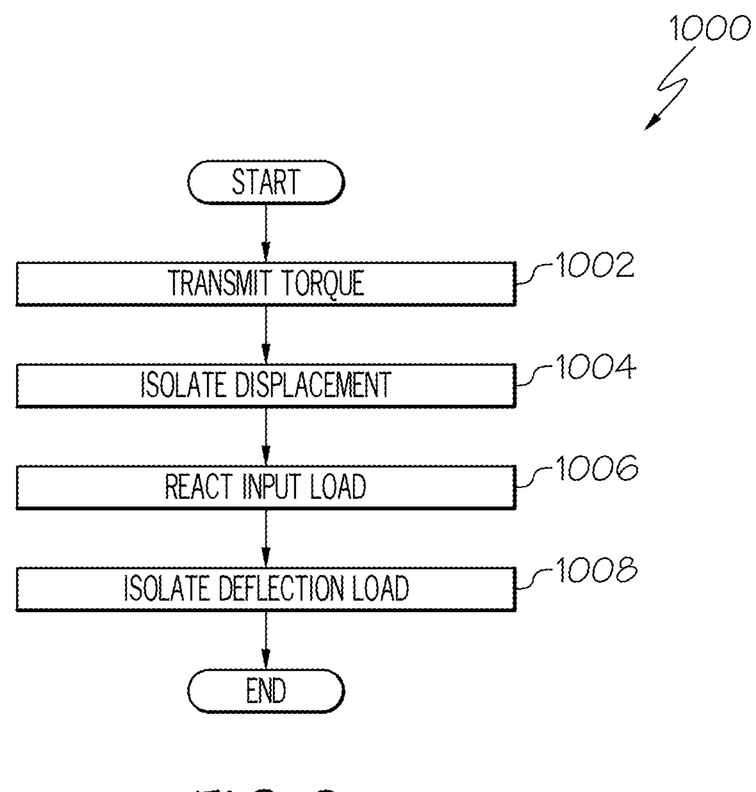
FIG. 2 is a flow diagram of an example of a method for transmitting torque.
Figure 3:
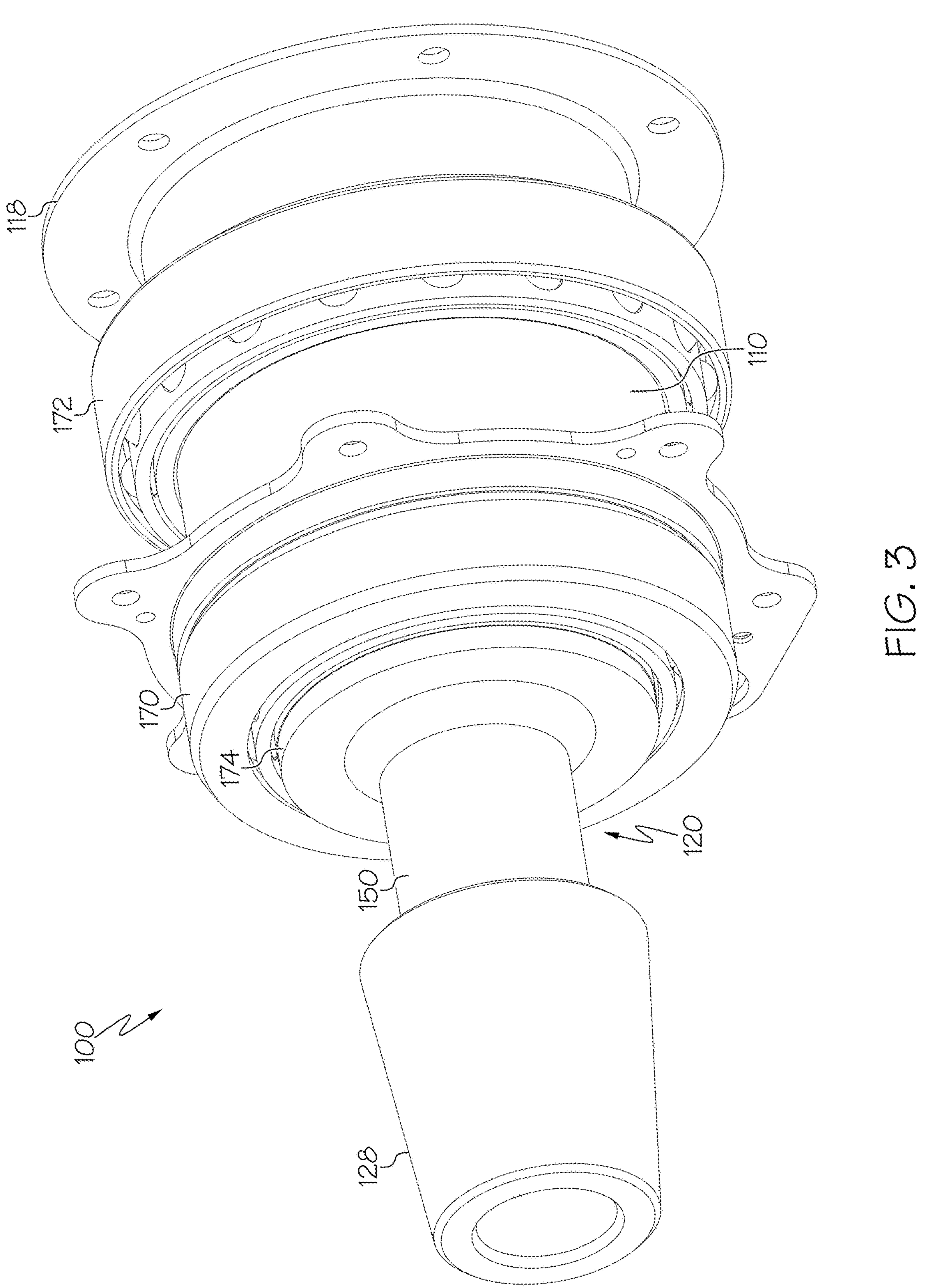
FIG. 3 is a perspective view of an example of the transmission assembly.

Referring now to FIG. 2, by way of examples, present disclosure is also directed to method 1000 for transmitting torque, also referred to herein as a transmission method. The following are examples of method 1000, according to the present disclosure. In one or more examples, method 1000 is implemented using transmission assembly 100 (FIGS. 1 and 3-19). Examples of method 1000 include a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

As illustrated in FIG. 2, in one or more examples, at 1002, method 1000 includes a step of transmitting torque. Torque (and/or motion, power, force, etc.) is transferred between first shaft 110 and second shaft 120 through overrunning clutch 130, which is coupled to and between first shaft 110 and second shaft 120.

As illustrated in FIG. 2, in one or more examples, at 1004, method 1000 includes a step of isolating displacement. In one or more examples, displacement or deflection between first connection interface 118 and second connection interface 128 is isolated by transmission assembly 100. In one or more examples, displacement between engagement section 150 of second shaft 120 is isolated relative to clutch section 140 of second shaft 120 and first shaft 110. In one or more examples, angular misalignment or displacement of engagement section 150 relative to clutch section 140 and first shaft 110 is accommodated and/or isolated by crowned spline coupling 160. Spline coupling 160 forms the interface between or is otherwise positioned or situated between engagement section 150 and clutch section 140. In one or more examples, angular misalignment or displacement of engagement section 150 relative to transmission housing 170 is accommodated and/or isolated by second bearing 174. In one or more examples, displacement between first shaft 110 is isolated relative to and engagement section 150 of second shaft 120. In one or more examples, angular misalignment or displacement of first shaft 110 and clutch section 140 relative to engagement section 150 is accommodated and/or isolated by crowned spline coupling 160. In one or more examples, angular misalignment or displacement of first shaft 110 and clutch section 140 relative to transmission housing 170 is accommodated and/or isolated by first bearing 172.

In one or more examples, the step of isolating the displacement or deflection between first connection interface 118 and second connection interface 128 and, more particularly, isolating angular displacement of engagement section 150 relative to clutch section 140 includes a step of pivoting engagement section 150 relative to clutch section 140 about pivot axis 102. In one or more examples, the step of isolating the displacement or deflection between first connection interface 118 and second connection interface 128 and, more particularly, isolating angular displacement of clutch section 140 relative to engagement section 150 includes a step of pivoting first shaft 110 and, thus, clutch section 140 with first shaft 110, relative to engagement section 150 about pivot axis 102.

As illustrated in FIG. 2, in one or more examples, at 1006, method 1000 includes a step of reacting to an input load. In one or more examples, an input load from an input source is reacted directly into transmission housing 170 from first shaft 110 (e.g., input shaft 210) via first bearing 172. In one or more examples, an input load from an input source is reacted directly into transmission housing 170 from second shaft 120 (e.g., input shaft 210) and, more particularly, from engagement section 150 via second bearing 174.

As illustrated in FIG. 2, in one or more examples, at 1008, method 1000 includes a step of isolating a deflection load. In one or more examples, a deflection load applied to first shaft 110 is isolated from engagement section 150 of second shaft 120 by crowned spline coupling 160. In one or more examples, a deflection load applied to second shaft 120 and, more particularly, engagement section 150 is isolated from clutch section 140 and first shaft 110 by crowned spline coupling 160.

Figure 10:
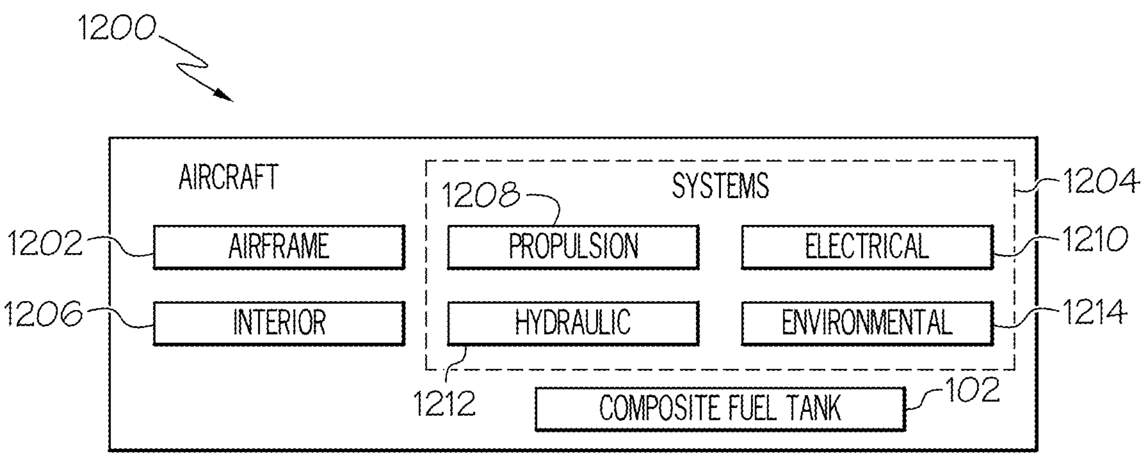
FIG. 10 is a block diagram of an example of an aircraft.
Figure 11:
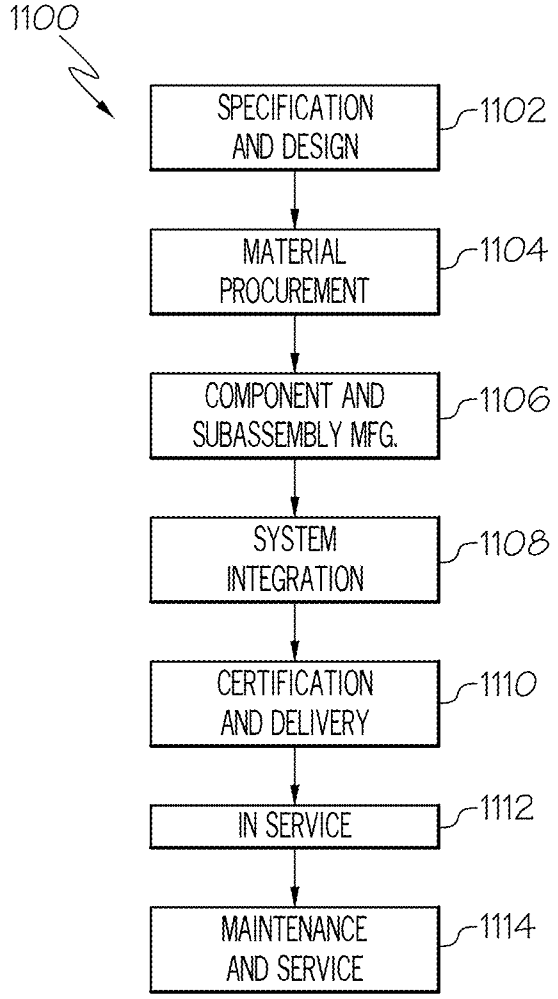
FIG. 11 is a flow diagram of an example of an aircraft manufacturing and service method.

Referring now to FIGS. 10 and 11 examples of transmission assembly 100, system 200, and method 1000, described herein, may be related to, or used in the context of, aircraft 1200, as schematically illustrated in FIG. 10, and aerospace manufacturing and service method 1100, as shown in the flow diagram of FIG. 11. As an example, aircraft 1200 and/or manufacturing and service method 1100 may utilize transmission systems having transmission assembly 100 and/or operated according to method 1000.

Referring to FIG. 10, which illustrates an example of aircraft 1200. Aircraft 1200 can be any aerospace vehicle or platform. In one or more examples, aircraft 1200 is a rotorcraft. In one or more examples, aircraft 1200 includes airframe 1202 (e.g., fuselage) having interior 1206. Aircraft 1200 includes a plurality of onboard systems 1204 (e.g., high-level systems). Examples of onboard systems 1204 of aircraft 1200 include propulsion systems 1208, hydraulic systems 1212, electrical systems 1210, and environmental systems 1214. In other examples, onboard systems 1204 also include one or more control systems coupled to airframe 1202 of aircraft 1200. In yet other examples, onboard systems 1204 include one or more other systems, such as, but not limited to, communications systems, avionics systems, flight control systems, software distribution systems, network communications systems, passenger information and/or entertainment systems, guidance systems, radar systems, weapons systems, and the like. In various examples, propulsion system 1208 of aircraft 1200 includes an engine (e.g., turboshaft or piston engine) that provides power to rotors, a main rotor that provides lift and thrust, and a transmission system (e.g., system 200) that distributes power from the engine to the main rotor utilizing transmission assembly 100 and/or according to method 1000.

Referring to FIG. 11, during pre-production of aircraft 1200, the manufacturing and service method 1100 includes specification and design 1102 of aircraft 1200 and material procurement 1104. During production of aircraft 1200, component and subassembly manufacturing 1106 and system integration 1108 of aircraft 1200 take place. Thereafter, aircraft 1200 goes through certification and delivery 1110 to be placed in service 1112. Routine maintenance and service 1114 includes modification, reconfiguration, refurbishment, etc. of one or more systems of aircraft 1200.

Each of the processes of manufacturing and service method 1100 illustrated in FIG. 11 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of transmission assembly 100, system 200, and method 1000, shown and described herein, may be employed during any one or more of the stages of manufacturing and service method 1100 shown in the flow diagram illustrated by FIG. 11. In an example, transmission systems (e.g., system 200) of aircraft 1200 can be manufactured using transmission assembly 100 and/or according to method 1000 during a portion of component and subassembly manufacturing 1106 and/or system integration 1108. Further, transmission systems (e.g., system 200) of aircraft 1200 can be manufactured using transmission assembly 100 and/or according to method 1000 while aircraft 1200 is in service 1112. Also, transmission systems (e.g., system 200) of aircraft 1200 can be manufactured using transmission assembly 100 and/or according to method 1000 during system integration 1108 and certification and delivery 1110. Similarly, transmission systems (e.g., system 200) of aircraft 1200 can utilize transmission assembly 100 and/or operate according to method 1000 while aircraft 1200 is in service 1112 and during maintenance and service 1114.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1 and 3-10, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1 and 3-10, referred to above, need to be included in every example and not all elements, features, and/or components described herein are necessarily depicted in each illustrative example. Accordingly, some of the elements, features, and/or components described and illustrated in FIGS. 1 and 3-10 may be combined in various ways without the need to include other features described and illustrated in FIGS. 1 and 3-10, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1 and 3-10, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1 and 3-10, and such elements, features, and/or components may not be discussed in detail herein with reference to each of FIGS. 1 and 3-10. Similarly, all elements, features, and/or components may not be labeled in each of FIGS. 1 and 3-10, but reference numerals associated therewith may be utilized herein for consistency.

In FIGS. 2 and 11, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2 and 11 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need to be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of assembly 100, system 200, and method 1000 have been shown and described, modifications may occur to those skilled in the art upon reading the specification. The present application includes such modifications and is limited only by the scope of the claims.

What is claimed is:

1. A transmission assembly comprising:

a transmission housing;

a first shaft;

a second shaft;

a second bearing coupled between an engagement section of the second shaft and the transmission housing; and an overrunning clutch coupled between the first shaft and the second shaft, wherein:

the second shaft comprises:

a clutch section coupled to the overrunning clutch; and the engagement section coupled to the clutch section by a flexible coupling;

the flexible coupling isolates displacement of the engagement section relative to the clutch section; and the second bearing has a radial clearance sufficient for the engagement section of the second shaft to pivot relative to the transmission housing about a pivot axis.

2. The transmission assembly of claim 1, wherein the engagement section is pivotable relative to the clutch section about a pivot axis that is at least approximately perpendicular to a second shaft axis.

3. The transmission assembly of claim 1, wherein the overrunning clutch comprises a sprag clutch.

4. The transmission assembly of claim 1, wherein:

the clutch section comprises a clutch-section body; and the clutch-section body is flexible.

5. The transmission assembly of claim 1, wherein the crowned spline coupling comprises:

external crowned splines formed on the clutch section; and internal crowned splines formed in the engagement section.

6. The transmission assembly of claim 1, wherein the engagement section of the second shaft is pivotable relative to the first shaft about a pivot axis that is at least approximately perpendicular to a second shaft axis.

7. The transmission assembly of claim 1, further comprising:

a first bearing coupled between the first shaft and the transmission housing, wherein the first bearing has a radial clearance sufficient for the first shaft to pivot relative to the transmission housing about the pivot axis.

8. The transmission assembly of claim 7, further comprising a third bearing coupled between the clutch section of the second shaft and the first shaft.

9. The transmission assembly of claim 1, wherein the clutch section comprises a quill shaft.

10. The transmission assembly of claim 1, further comprising:

a flange coupled to the first shaft; and a pinion gear coupled to the second shaft.

11. The transmission assembly of claim 1, wherein:

the first shaft is one of an input shaft or an output shaft; and the second shaft is another one of the output shaft or the input shaft.

12. A system comprising:

a transmission housing;

a power input;

input shaft coupled to the power input;

an output shaft comprising:

a clutch section; and an engagement section coupled to the clutch section by a flexible coupling;

a second bearing coupled between the engagement section of the output shaft and the transmission housing;

an overrunning clutch coupled between the input shaft and the clutch section of the output shaft; and a main transmission coupled to the output shaft, wherein:

the flexible coupling isolates displacement of the engagement section relative to the clutch section; and the second bearing has a radial clearance sufficient for the engagement section of the output shaft to pivot relative to the transmission housing about a pivot axis.

13. The system of claim 12, wherein the engagement section is pivotable relative to the clutch section via the flexible coupling about a pivot axis that is at least approximately perpendicular to a second shaft axis.

14. The system of claim 12, further comprising:

a flange coupled to the input shaft together; and a pinion gear coupled to the output shaft, wherein:

the power input is coupled to the flange; and the main transmission is coupled to the pinion gear.

15. The system of claim 12, wherein the flexible coupling comprises a crowned spline coupling, comprising:

external crowned splines formed on the clutch section; and internal crowned splines formed in the engagement section.

16. The system of claim 12, wherein:

the overrunning clutch comprises a sprag clutch; and the clutch section comprises a quill shaft.

17. The system of claim 12, further comprising:

a first bearing coupled between the input shaft and the transmission housing;

a third bearing coupled between the clutch section of the output shaft and the input shaft, wherein the first bearing has a radial clearance sufficient for input shaft to pivot relative to the transmission housing about the pivot axis.

18. A method comprising:

transmitting torque between a first shaft and a second shaft through an overrunning clutch coupled between the first shaft and the second shaft;

isolating a displacement of an engagement section of the second shaft relative to a clutch section of the second shaft by a flexible coupling between the engagement section and the clutch section; and enabling the engagement section of the second shaft to pivot relative to a transmission housing about a pivot axis via a radial clearance of a second bearing coupled between the engagement section of the second shaft and the transmission housing.

19. The method of claim 18, wherein isolating the displacement of the engagement section relative to the clutch section comprises pivoting the engagement section relative to the clutch section.

20. The method of claim 18, further comprising:

reacting an input load directly into a transmission housing from the first shaft; and isolating a deflection load applied to the first shaft from the engagement section of the second shaft by the crowned spline coupling.

* * * * *